Figure 1:
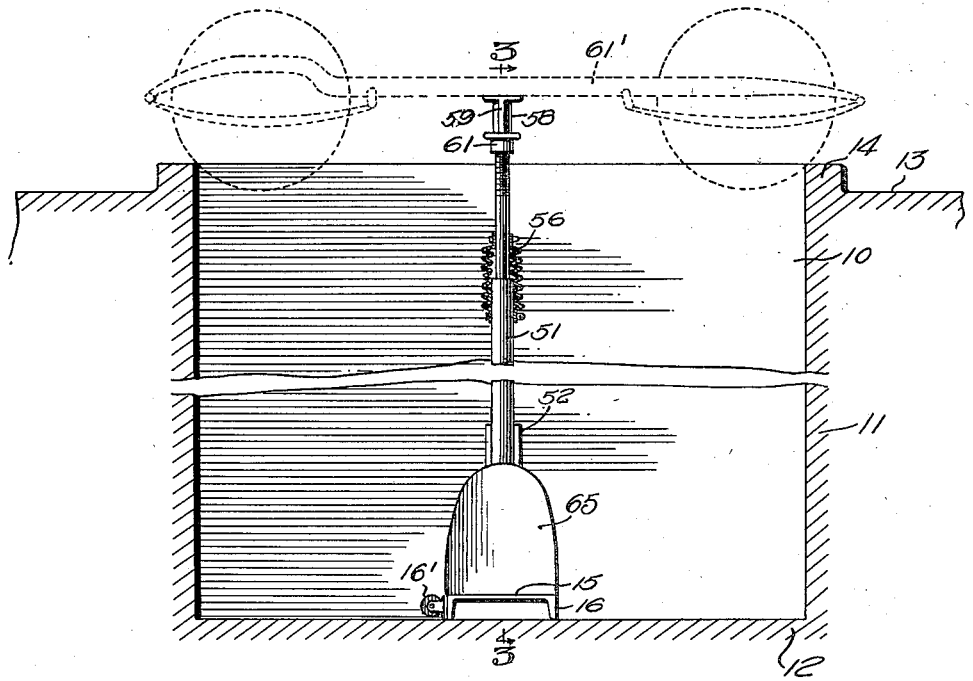

Dec. 7, 1937.   P. J. KROLL   2,101,397
VEHICLE ROCKING APPARATUS
Filed Nov. 27, 1934   2 Sheets-Sheet 1.

Inventor
P. J. KROLL
By C. L. Parker, Jr.
Attorney

Dec. 7, 1937.  P. J. KROLL  2,101,397
VEHICLE ROCKING APPARATUS
Filed Nov. 27, 1934  2 Sheets-Sheet 2
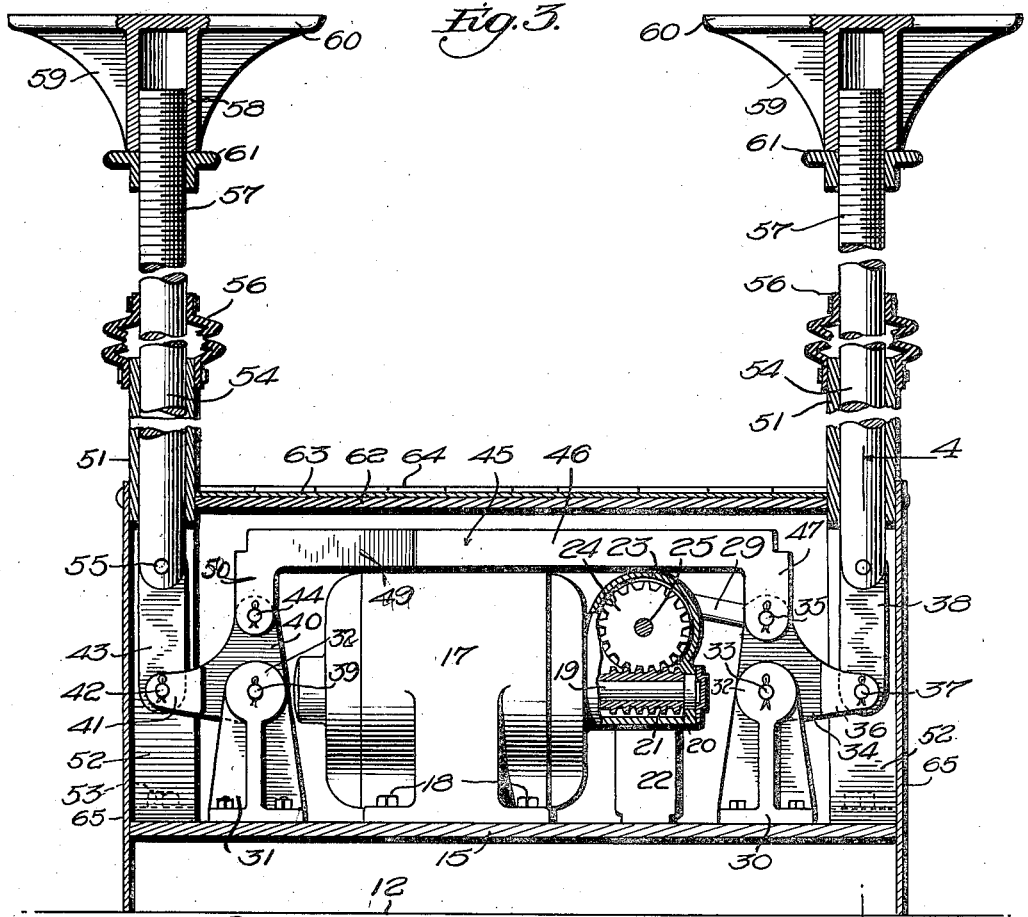
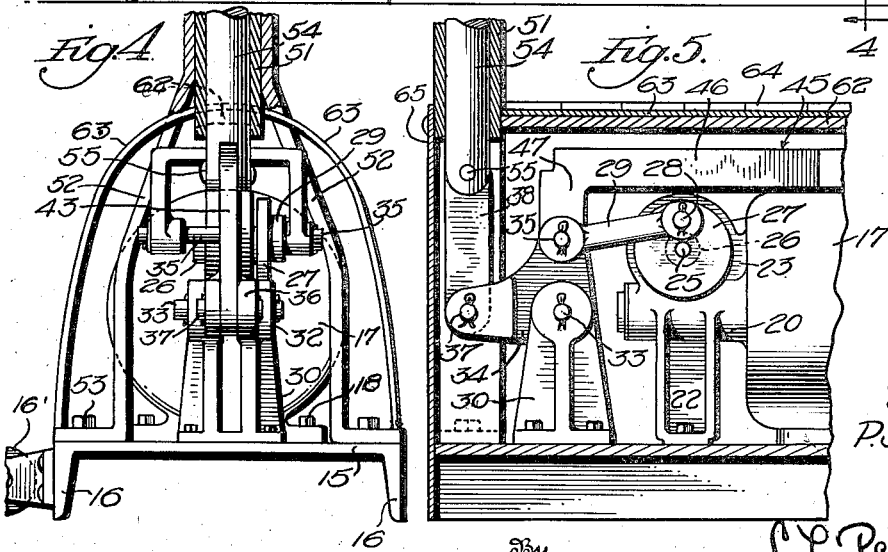
Inventor
P. J. KROLL Patented Dec. 7, 1937

2,101,397

UNITED STATES PATENT OFFICE 2,101,397

VEHICLE ROCKING APPARATUS

Philip J. Kroll, New York, N. Y.

Application November 27, 1934, Serial No. 755,038

8 Claims. (Cl. 73—51)

This invention relates to vehicle rocking apparatus, and particularly to an apparatus for use in assisting in the lubrication of motor vehicle parts, and is an improvement over the structure disclosed in my copending application Serial No. 734,666, filed July 11, 1934, now Patent 2,030,174, dated Feb. 11, 1936.

Motor vehicle service stations usually are equipped either with greasing pits or vehicle lifts to permit operators to gain access to the bottoms of vehicles for the purpose of lubricating the various parts thereof, such as the shackle bolts and springs. Pressure lubricating devices are provided for this purpose having attachments for connection with the various lubricating fittings of the vehicle, whereby lubricant may be supplied thereto under pressure. Moreover, it is the common practice to spray the spring leaves of the vehicle with lubricants to reduce the surface friction therebetween. These types of lubricating apparatus are only partially effective for the reason that a vehicle is lubricated with the entire weight of the vehicle supported on the wheels. The tight contact between the parts, due to the supporting of the vehicle body, renders it difficult for the lubricant to force its way between all coacting bearing surfaces.

An important object of the present invention is to provide a novel and relatively simple form of apparatus for supporting the weight of a vehicle body independently of the running gear to facilitate the lubrication of the motor vehicle parts.

A further object is to provide a novel apparatus for rocking the vehicle to effect relative movement between the parts to be lubricated while the lubricant is being applied thereto, to assist in the proper distribution of the lubricant.

A further object is to provide an apparatus which is operative for supporting the weight of the vehicle to relieve the pressure between the different parts to facilitate the passage of lubricant therebetween, and which is operative for rocking the vehicle body while thus supported to maintain relative movement between the bearing parts, such as the spring leaves and shackle bolts, to thus further facilitate the feeding of the lubricant to the points where lubricant is most greatly needed.

A further object is to provide a simple form of apparatus of the character referred to which is equally adaptable for use in greasing pits or beneath the vehicle supporting frames of vehicle lifts, and which is so constructed as to be readily portable.

A further object is to provide an apparatus of the character referred to which interferes to a minimum extent with the free access of an operator to the bottom of a motor vehicle.

Other objects and advantages of the invention will become apparent during the course of the following description.

Figure 2:
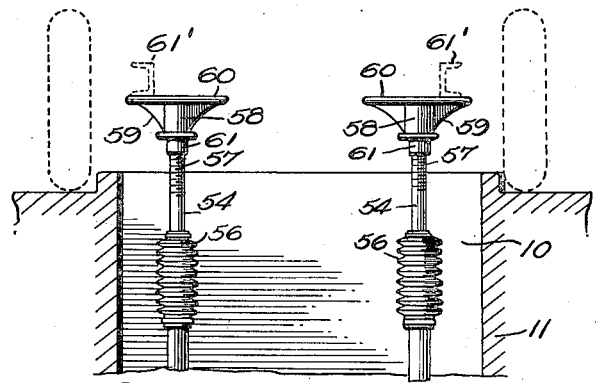

In the drawings I have shown one embodiment of the invention. In this showing:

Figure 1 is a vertical longitudinal sectional view through a greasing pit showing the invention in position, parts being shown in section and parts being broken away, Figure 2 is a transverse vertical sectional view of the same, Figure 3 is an enlarged vertical sectional view on line 3—3 of Figure 1, parts being shown in elevation and parts being broken away, Figure 4 is a fragmentary detail vertical sectional view on line 4—4 of Figure 3, parts being shown in elevation.

Figure 6:
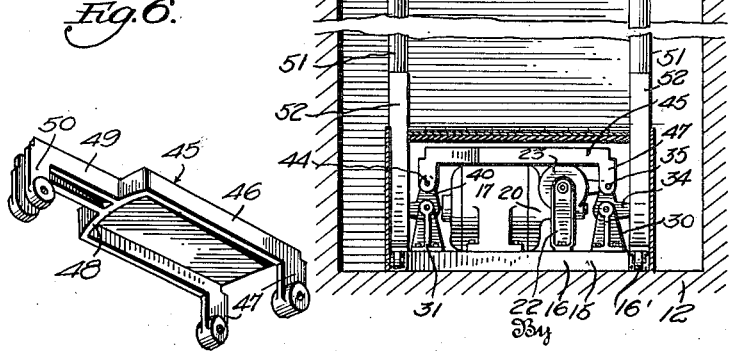

Figure 5 is a fragmentary view similar to Figure 3 showing one end of the apparatus and looking at the opposite side thereof, and, Figure 6 is a detail perspective view of a connecting member.

Referring to Figures 1 and 2, the numeral 10 designates a greasing pit defined by vertical walls 11 and a bottom wall 12. The pit is surrounded by the usual concrete runway 13 or other supporting surface, and the walls of the pit extend slightly above the runway as indicated at 14. The pit described is of the conventional type and forms no part of the present invention and it will become apparent that the invention is not limited to use in a pit, but may be used with other forms of apparatus, such as conventional vehicle lifts.

The present device comprises a base 15 which may be of channeled section, as illustrated in Figure 4, the base including depending flanges 16 resting upon the bottom wall 12 of the pit. One flange 16 is provided with casters 16', normally out of contact with the ground, for a purpose to be described. The base 15 supports a motor 17 which forms the driving means for the elements to be described, and the motor is bolted to the base 15 as at 18. The shaft 19 of the motor extends from one end thereof into a gear housing 20 and is provided within such housing with a worm 21. The housing 20 may be rigidly supported with respect to the base 15 by a bracket or support 22 formed integral with the gear housing 20.

The housing 20 is formed integral with an upper housing 23 in which is arranged a worm wheel 24 meshing with and driven by the worm 21.

The wheel 24 is mounted upon a shaft 25 journaled at its opposite ends in bearings 26 mounted in opposite walls of the casing 23. Outwardly of one side of the casing 23, the shaft 25 is provided with a driving disk 27 having a crank pin 28 connected to one end of a driving link 29.

A pair of supporting brackets 30 and 31 are arranged adjacent each end of the base 15 and these brackets are identical with each other. Each bracket carries spaced bearings 32 at its upper end. The bearing of the bracket 30 carries a shaft 33 pivotally supporting a bell crank lever 34. One end of the bell crank lever is provided with a relatively long pivot pin 35 pivotally connecting it to the other end of the link 29, as shown in Figures 3 and 5. The other end of the bell crank lever is forked as at 36 and receives a pivot pin 37 connecting it to an upwardly extending link 38. It will be apparent that rotation of the worm wheel 24, when driven by the motor, rocks the bell crank lever 34 about its pivot 33, thus imparting a substantially reciprocating movement to the link 38.

The bearing of the bracket 31 carries a pivot pin 39 at its upper end pivotally supporting a bell crank lever 40 which is identical with the lever 34 but is reversed in its position with respect thereto. One end of the bell crank lever 40 is forked as at 41 to receive a pivot pin 42 to pivotally connect it to the lower end of an upstanding link 43 identical with the link 38. The upper end of the bell crank lever also carries a pivot pin 44, and this pin is connected to the pin 35 previously described. As shown, a connecting member 45 is arranged above the motor 17, and one end 46 of the connecting member is relatively wide and terminates in depending arms 47 pivotally receiving the ends of the pivot pin 35. The end 46 of the connecting member is of channeled cross-section and the flanges of the sides of this member are connected by a transverse member 48 which has its under side arched, as shown in Figures 4 and 6, to permit the connecting member to be arranged as close as possible to the motor 17 and thus minimize the over-all height of the apparatus. The other end 49 of the connecting member is formed of a pair of spaced parallel integral members terminating in depending arms 50 receiving the pivot or pin 44.

A vertical bearing tube 51 is arranged adjacent each end of the apparatus and is supported with respect to the base by brackets 52. These brackets may be welded to the tubes 51 and may be bolted to the base 15 as at 53. Each bearing tube is provided with a vertically reciprocable jack shaft 54 pivotally connected at its lower end as at 55 to the upper end of one of the links 38 or 43. A longitudinally collapsible boot 56 is connected at its upper end to each of the shafts 54 and at its lower end to the corresponding tube 51. These boots effectively prevent the entrance of dust or other foreign material into the upper ends of the tubes 51.

The upper end of each shaft 54 is threaded as at 57 and is slidable in a sleeve 58 forming an integral part of a vehicle frame engaging member 59. Each frame engaging member is provided with wing portions 60 extending transversely of the sleeve 58, as shown in Figure 3. A collar 61 is threaded on the upper end of each shaft 51 and engages the bottom of one of the sleeves 58 to support it against downward movement. The engaging members 59 are engageable against the bottom of the side frames 61' of a motor vehicle, as indicated in Figures 1 and 2.

A tie rod 62 is connected between the tubes 51, just above the connecting member 45, and braces the tubes 51 with respect to each other. The tie rod likewise supports a hood formed of sections 63 pivotally connected to each other as at 64. The hood is completed by end members 65, and accordingly it will be apparent that the operating mechanism of the apparatus is adequately protected against injury and from dirt and other foreign material.

The operation of the apparatus is as follows:

A vehicle is driven into position over the pit 10 as indicated in dotted lines in Figure 1. The nuts 61 are engageable by a suitable tool, such as a spanner wrench, and such tool is employed for rotating the nuts 61 for elevating the engaging members 59. The upper surfaces of these members engage beneath the side frames 61' of the vehicle, as indicated in Figure 2, and when the nuts 61 are turned upwardly, the engaging members 59 elevate the vehicle frames, thus relieving the springs and shackle bolts of the weight of the vehicle.

The motor 17 is then started in operation, and the rotation of the motor shaft 19 is transmitted to the shaft 25 through the worm 21 and worm wheel 24. The disk 27 and crank pin 28 obviously rotate with the shaft 25, and motion accordingly will be transmitted to the bell crank lever 34 through the link 29. The pin 37 thus transmits vertical movement through the link 38 to the rod 54 connected thereto, and this rod accordingly will be vertically reciprocated. Since one of the side frames 61' of the vehicle will be supported on the associated engaging member 59, it will be apparent that such side frame member will be moved vertically.

The motion of the link 29 is transmitted through the pin 35 to the adjacent end of the connecting member 45, and this member will be moved back and forth substantially horizontally. The motion of the connecting member 45 will be transmitted through the pin 44 to the bell crank lever 40 to rock this element about its pivot pin 39. In this connection, it will be noted that the pins 35 and 44 move in a relatively short arc of a circle concentric with the pivot pins 33 and 39, and that the vertical component of movement of the pins 35 and 44 is substantially negligible. Accordingly the connecting member 45 partakes of substantially a horizontal reciprocating motion, and may be arranged relatively close to the motor 17.

The rocking motion transmitted to the bell crank lever 40 in the manner referred to is transmitted from the pivot pin 42 through the link 43 to the associated rod 54, and this rod accordingly will be vertically reciprocated. Since the adjacent frame member 61' is supported on the associated engaging member 59, it will be apparent that it will be moved vertically to the same extent as the other frame member 61'. However, while the connecting member 45 causes simultaneous rocking movement of the bell crank levers 34 and 40 to take place, these members are always rocking in opposite directions. Accordingly, as the pivot pin 37 moves downwardly the pivot pin 42 will be moving upwardly, and when the pin 37 starts to move upwardly, the pivot pin 42 will move downwardly. The same action takes place in connection with the engaging members 59, and accordingly it will be obvious that the frame of the vehicle will be constantly rocked laterally during the operation of the motor 17.

During the rocking movement of the vehicle, the operator may lubricate the various underside parts of the vehicle in the usual manner. The lubricating hose fittings may be connected to the shackle bolt fittings to permit lubricant to be supplied thereto under pressure. The elevation of the vehicle by turning the nuts 61 upwardly relieves the shackle bolts of the weight of the vehicle body, thus permitting the lubricant to flow more freely between the surfaces which normally are tightly in contact with each other. This action, of course, will be greatly assisted by the rocking motion imparted to the vehicle body since the bearing surfaces referred to will be maintained in constant relative motion to assist in the proper distribution of the lubricant. The same operation takes place in connection with the vehicle springs except that the springs may be sprayed with the usual lubricant provided for this purpose. The relieving of the springs of the weight of the vehicle and the constant flexing of the springs due to the rocking of the vehicle body assists in equally and thoroughly lubricating the contacting surfaces of the spring leaves.

When the lubricating action has been completed the motor 17 is stopped, whereupon the nuts 61 are turned downwardly to release the engaging members 59 from the frame of the vehicle. The vehicle then may be driven from the pit as will be apparent. While the device has been described in connection with a conventional greasing pit, it will be obvious that it is not limited to such use. For example, the device may be used equally well beneath a vehicle supported on a conventional vehicle lift. It will be apparent that the casters 16' may be utilized for moving the device into position beneath a car after it has been elevated on a lift, and the device readily may be removed from such position after the greasing operation has been completed and before the vehicle is lowered.

In this connection it will be noted that the casters 16' normally are out of engagement with the ground or other supporting surface, but when it is desired to transport the apparatus, the operator may grasp the rods 57 and tilt the device downwardly toward the side at which the casters 16' are arranged, whereupon these elements contact with the surrounding surface and permit the device to be readily moved from place to place in a manner similar to the use of ordinary two-wheeled trucks. The transporting of the device is greatly facilitated because of the extremely low center of gravity of the apparatus, most of the heavy parts being arranged within the hood 63 and relatively close to the ground. It likewise will be apparent that the space between the posts 57 and the low arrangement of the hood 63 facilitates the use of the device for the reason that it permits an operator to readily step over the hood in moving from one end of the vehicle to the other. This is particularly true when the apparatus is used in a greasing pit, as shown in Figures 1 and 2.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a base, a motor arranged on said base, bearing brackets mounted on said base adjacent opposite ends thereof, a pair of vertical posts arranged above the end portions of said base, guide means carried by said base for guiding said posts for vertical movement, a pair of oppositely arranged bell crank levers pivotally supported intermediate their ends by said bearing brackets and lying in a common vertical plane longitudinally with respect to said base, each bell crank lever having a horizontal arm connected to the lower end of one of said posts and a vertically extending arm, a horizontal rigid member lying in said plane above said motor and connecting the ends of said vertical arms, and means including said motor for transmitting a longitudinal reciprocating motion to said rigid member.

2. Apparatus of the character described comprising a pair of upwardly extending posts having means at their upper ends engageable beneath the frame of a motor vehicle, a source of power, a pair of oppositely operable bell crank levers pivotally supported intermediate their ends on spaced parallel axes and each having one end connected to one of said posts, said ends of said bell crank levers extending away from each other, connecting means pivotally connected to the other ends of said levers, said bell crank levers and said connecting means constituting motion transmitting means between said posts, and means including said source of power for transmitting motion to said motion transmitting means for reciprocating said posts.

3. Apparatus of the character described comprising a pair of upwardly extending posts having means at their upper ends engageable beneath the frame of a motor vehicle, a pair of oppositely operable bell crank levers pivotally supported intermediate their ends on spaced parallel axes and each having one end connected to one of said posts, said ends of said bell crank levers extending away from each other, transmission means between and pivoted to the other ends of said levers, and means including a power source for effecting the rocking of said bell crank levers.

4. Apparatus of the character described comprising a base, a motor arranged on said base, bearing means supported by said base adjacent opposite ends thereof and having parallel axes, a pair of upstanding posts arranged above the end portions of said base, a pair of oppositely operable bell crank levers pivotally supported intermediate their ends by said bearing means and each having one end connected to one of said posts, said ends of said bell crank levers extending away from each other, connecting means between and pivotally connected to the other ends of said bell crank levers, said bell crank levers and said connecting means constituting motion transmitting means between said posts, and driving connections between said motor and said motion transmitting means.

5. A vehicle rocking apparatus comprising a pair of upstanding posts each having means at its upper end engageable beneath the frame of a motor vehicle, a pair of spaced parallel pivot supports, a bell crank lever pivoted between its ends on each pivot support and having one end extending laterally with respect thereto, said ends of said bell crank levers extending away from each other and respectively connected to said posts, the other ends of said bell crank levers being arranged at a substantial angle to the horizontal, a motor, and transmission means for alternately transmitting motion from said motor to said last named lever ends to exert a pull thereon.

6. A vehicle rocking apparatus comprising a pair of upstanding posts each having means at its upper end engageable beneath the frame of a motor vehicle, a pair of spaced parallel pivot supports, a bell crank lever pivoted between its ends on each pivot support and having one end extending laterally with respect thereto, said ends of said bell crank levers extending away from each other and respectively connected to said posts, the other ends of said bell crank levers being arranged at a substantial angle to the horizontal, power transmission means between the last named ends of said levers operable for alternately transmitting a pulling force thereto, and means including a motor for actuating said transmission means.

7. A vehicle rocking apparatus comprising a pair of upstanding posts each having means at its upper end engageable beneath the frame of a motor vehicle, a pair of spaced parallel pivot supports, a bell crank lever pivoted between its ends on each pivot support and having one end extending laterally with respect thereto, said ends of said bell crank levers extending away from each other and respectively connected to said posts, the other ends of said bell crank levers being arranged at a substantial angle to the horizontal, a direct unitary power transmission member pivotally connected at its ends to the last named ends of said levers, and means including a motor for actuating said transmission member.

8. Apparatus of the character described comprising a pair of upwardly extending posts having means at their upper ends engageable beneath the frame of a motor vehicle, a pair of bell crank levers pivotally supported intermediate their ends on spaced parallel axes and each having one end connected to one of said posts, said ends of said bell crank levers extending away from each other, and motion transmitting means, including a motor, connected to the other ends of said bell crank levers to rock them on their axes.

PHILIP J. KROLL.